United States Patent Office 3,234,141
Patented Feb. 8, 1966

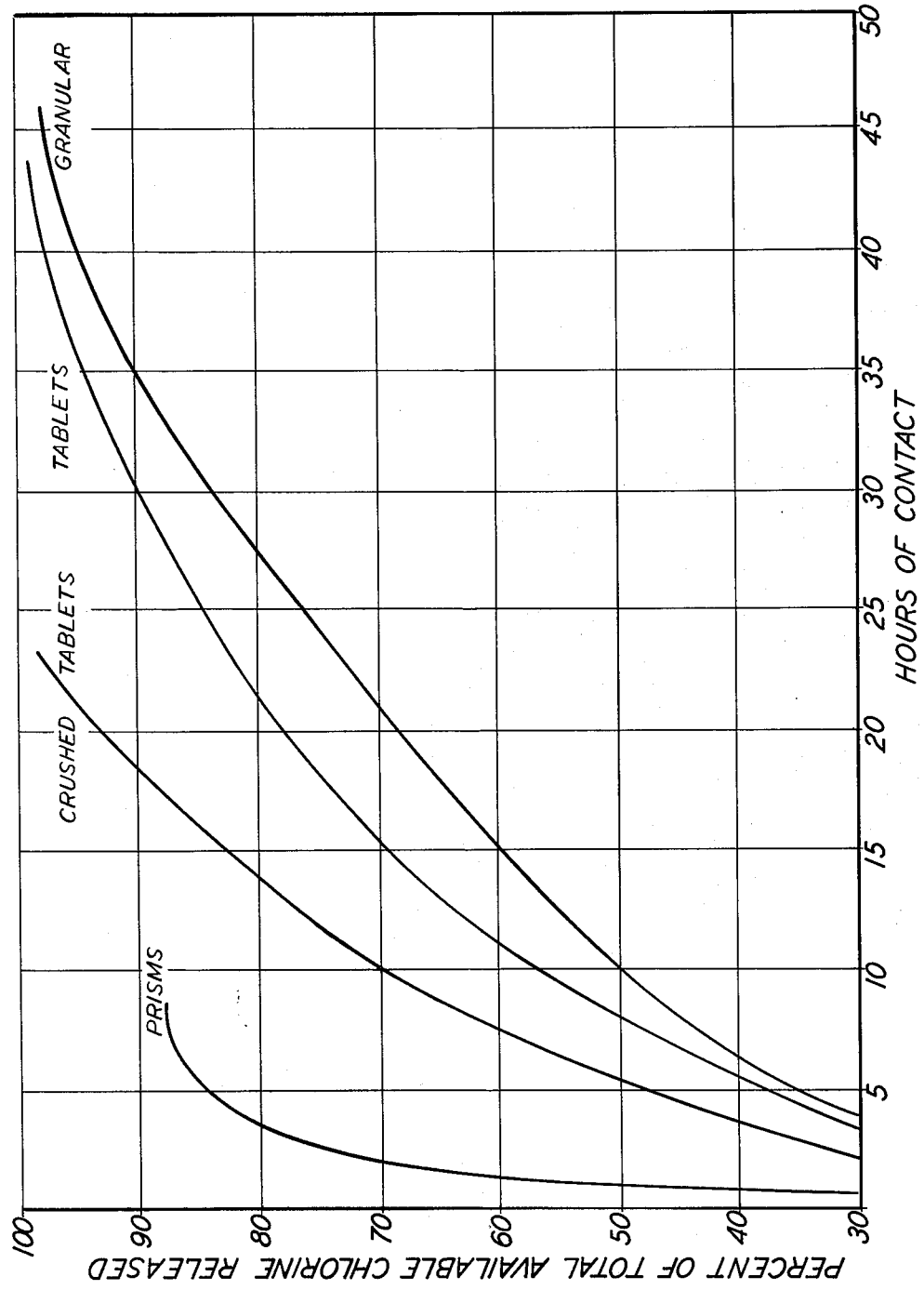

3,234,141
MANUFACTURE OF CALCIUM HYPO-
CHLORITE ARTICLE
Homer L. Robson, New Haven, Conn., assignor to Olin
Mathieson Chemical Corporation, a corporation of
Virginia
Filed Mar. 29, 1963, Ser. No. 268,970
6 Claims. (Cl. 252—187)

This invention relates to new and improved calcium hypochlorite articles containing sodium sulfate and to the process of preparing them. More particularly it relates to mixtures of commercial calcium hypochlorite and sodium sulfate, so blended and compressed that when placed in water, the sodium hypochlorite formed by reaction between the sulfate and hypochlorite leaches out, the residue retaining substantially its original form. This residue can be removed and discarded easily. The novel product of this invention finds particular utility in water treatment.

Mixtures of calcium hypochlorite and sodium sulfate are known to the art in U.S. Patent 1,678,987, issued to James D. MacMahon on July 31, 1928. This patent describes the preparation and use of mixtures of anhydrous sodium sulfate with calcium hypochlorite and the stability of such mixtures. However, the mixture of the patent when added to water forms a suspension of calcium sulfate in a solution of sodium hypochlorite. This suspension is settled and the clear liquor decanted to produce sodium hypochlorite solutions.

In water treatment there is presently a need for a simpler source of sodium hypochlorite liquor, preferably in weighed or easily calculated amounts avoiding the need for allowing a suspension to settle, and then withdrawing only the top, clear portion of the liquor. While this decanting operation is not particularly cumbersome, there is an objectionable loss of time while the calcium sulfate crystals are growing to separable size and settling, which may be annoying to the customer, and in some military uses quite objectionable.

It is well known that hypochlorite is stored and shipped in the form of calcium hypochlorite compounds because calcium hypochlorite crystals are stable and the loss of chlorine in storage and shipment is so small as to be permissible. On the other hand, sodium hypochlorite in solid form is a dangerous and frequently explosive material. It does not have sufficient stability for either storage or shipment. It is used commercially only in the form of solutions. The common household bleach solution contains only about 5 percent of available chlorine. The more concentrated commercial solutions, containing 12 to 15 percent sodium hypochlorite, have so short a life that they are usually obtained by the user from the manufacture shortly before use.

In water treatment, the purification of the water may be preceded by or followed by a filtration to remove objectionable materials. With many water supplies it is important to treat the water with hypochlorites before filtering it. Not only are filtration rates improved by the prior destruction of organisms and slimes by the hypochlorite, but other advantages, such as time for mixing in coagulant chemicals, is provided by this timing. This is especially appropriate in the treatment of field supplies of water, which may be highly contaminated. However, in many instances it is found that if the hypochlorite is supplied as calcium hypochlorite, the calcium content of this material reacts with substances in the water to form products which seriously impede filtration.

If the water is hard, having a high content of carbonate ions, the addition of the calcium in the calcium hypochlorite preparation may cause calcium carbonate to precipitate. This material may first appear as the somewhat gelatinous hexahydrate, which will then change to the fine grained, difficultly filtrable vaterite, and eventually to the more tractable calcite form of calcium carbonate. The immediate form in which the calcium carbonate appears is frequently difficult to filter, and its presence impedes the needed filtration of the water. Other insoluble compounds besides calcium carbonate may be formed. For this reason, although the hypochlorite must be stored and shipped in the form of calcium hypochlorite, it is desirable to add sodium hypochlorite, or mostly sodium hypochlorite, in the water treatment process. Thus, where time permits and the operation is not considered objectionable, calcium hypochlorite may be dissolved in water, sodium carbonate or sodium sulfate added, time allowed for the reaction and growth of the precipitate and for the settling of the precipitate and the clear supernatant liquor then decanted and added at the water treatment station. An objection to this procedure is the uncertain recovery of the available chlorine in the clear liquor. If the mixing has been improperly done, or if the time available for settling is insufficient, the amount of clear liquor that is decanted may be appreciably less than the optimum. Accordingly, the quantity of hypochlorite or available chlorine added to the water treatment may be less than the desired dosage. Thus the need arises for a dry material which can be added to the water and in which most of the calcium present in the calcium hypochlorite does not pass into solution in the water nor mix with it as a suspension. This is a principal object of the present invention.

The objects of this invention are accomplished by preparing a mixture in suitable proportions or finely divided calcium hypochlorite and anhydrous sodium sulfate and forming the mixture under pressures sufficient to cause particle flow into sticks having the form of triangular prisms with one rounded edge opposite a concave side.

Suitable calcium hypochlorite for the purposes of the present invention contains 70 percent or more of available chlorine. The fine material useful in the present invention is obtained as a by-product in the manufacture of granular material which is sold commercially. However, other grades of calcium hypochlorite can be reduced to fines by comminution. Anhydrous sodium sulfate is also finely ground. Both materials contain at least 25 percent finer than 100 mesh (U.S. Standard screens) and none coarser than 30 mesh. These materials are mixed in the ratio of from 0.8 to 2 or more parts by weight of sodium sulfate to 1 of calcium hypochlorite. This provides a composition containing at least a stoichiometric proportion of sodium sulfate taking into account any calcium compounds present in addition to calcium hypochlorite. (Lime and calcium chloride are commonly present in minor proportions in commercial calcium hypochlorite.) Larger amounts of sodium sulfate can be used as diluent to control the available chlorine content of the composition and of the rate and amount of available chlorine furnished to the body of water to which the composition is added. It is preferable however, to use another inert salt as diluent when more than about 2 parts of salt to one of calcium hypochlorite is required. Such dilution is desirable, for example, to produce a material containing less than 38 percent of available chlorine which can be shipped in fiberboard containers instead of the metal containers required for products having 39 percent or more of available chlorine.

Suitable inert diluent salts are water-soluble inorganic alkali metal salts which are non-reactive with calcium hypochlorite and which do not adversely affect its stability. Sodium chloride and sodium nitrate are especially useful as inert diluent salts which are stable to and otherwise compatible with calcium hypochlorite. Both are advantageously readily soluble in water and facilitate rapid dispensing of the available chlorine to the body of water to which they are added. Other suitable inert diluent salts include potassium chloride, potassium nitrate and lithium chloride. The proportion of added inert diluent salt can be as much as 50 percent by weight of the mixture. However, for the purposes for which the present product is designed, it is usually desirable to use much less of the inert diluent salt and the addition of diluent salt can be omitted entirely. The inert diluent salts, when used, need not meet the same fineness specifications as recited above for the sodium sulfate and calcium hypochlorite. This is not so critical in the inert diluent salt as in the calcium hypochlorite and sodium sulfate. For example, the added diluent salt should pass 30 mesh but may be all retained on 100 mesh. The so-called "butterflake" salt having an apparent density of 0.7 to 0.9 is suitable.

Calcium hypochlorite, as the term is used in this specification and claims means true $Ca(OCl)_2$. Commercial calcium hypochlorite having 70 to 80 percent available chlorine which is particularly useful in the manufacture of the articles of the present invention contains diluent salts which amount to 0.2 to 0.5 part per part of $Ca(OCl)_2$. The total of added diluent salt and diluent contained in the commercial calcium hypochlorite may amount to as much as 3 parts per part of calcium hypochlorite.

The process of the present invention is advantageously accomplished by passing an intimate mixture of finely divided calcium hypochlorite and sodium sulfate through a "Chilsonator." This machine pre-compresses the powder mixture under 5 to 50 pounds and feeds it into the nip between a pair of oppositely driven rolls which are circumferentially corrugated and which bear against each other with a pressure of 10 to 60 tons per lineal inch. The resulting pressures on the powder mixture are about 50 to 500 tons per square inch. The corrugations consist of alternating ridges and valleys, curvilinear in cross-section, with the ridges truncated so that they do not penetrate to bottoms of the valleys. The shoulders of the ridges on one roll bear on the walls of the valleys in the opposite roll. The powder mixture is forced between the rolls which are driven at a rate of about 7 to 36 r.p.m. and the mixture is thus extruded in the form of a modified triangular stick. The base of the triangle is slightly concave, being formed by the corrugation on one roll. The sides of the triangle are formed by the corrugation on the other roll. From the mid-point of the base to the apex of the triangle is approximately one-eighth of an inch, and the width of the base is one-eighth of an inch. Thus all the material is less than $1/16$ inch from a surface.

When the powder mixture is fed under high pressure, sufficient material is forced between the rolls to form a web between the prisms and thus to bind the prisms into multiple sticks. A minor proportion of web material is not objectionable and it results in lower apparent densities in the packed product. The apparent density can be as low as 0.5 with a large proportion of multiple sticks but ordinarily an apparent density of 0.8 to 1.0 is preferred. When the sticks are subsequently broken, as may be desirable in some compositions, they should still be longer than the length of their cross-section and preferably at least 0.5 inch in length. Crushed sticks can have an apparent density of as high as 1.1 although for rapid dissolution lower apparent densities are preferable.

A surprising feature of this invention is that when the thus formed modified triangular prisms or sticks of the specified composition are immersed in water they retain both their original form and the calcium sulfate by-product but they become porous allowing rapid leaching of the sodium hypochlorite. Thus, when these sticks are immersed in water, the reaction of the calcium hypochlorite and the sodium sulfate takes place very rapidly. However, the initial solution formed is somewhat supersaturated with respect to gypsum, and this supersaturation may not be fully relieved for about 15 minutes. Crystals of gypsum grow, mostly in needle form, interlacing to form a rigid structure having the same form as that of the initial stick. The strong sodium hypochlorite solution, which may have a density of from 1.20 to 1.24 relative to water being 1.0, diffuses out of the stick. The solution on the immediate outside layer of the stick is released very quickly and the solution from the center over a longer period of time. The high density of the sodium hypochlorite solution causes it to flow downward out of the stick and to be replaced with either weaker solution or with water. In a suitable container, this release of the sodium hypochlorite is usually over 85 percent complete in one hour. In the preferred embodiment of this invention, the mixture of fine sodium sulfate and calcium hypochlorite is compressed into thin sticks, roughly $1/8$ inch by $1/8$ inch, having a length of 1 to 1.5 inches. Since all of the material is less than $1/16$ inch from a surface, the strong hypochlorite solution rapidly diffuses through the pore spaces into the body of water. Thus if a pound of the sticks is placed in a container formed of a screen, or of a perforated plastic envelope having $1/8$ inch holes to permit rapid flow of water into and solution out of the container, the leaching out of the strong sodium hypochlorite solution is usually 80 to 95 percent complete in one hour. After the release of this major portion of the sodium hypochlorite, the solution remaining within the pore spaces of the sticks is so low in specific gravity that the driving force to cause it to flow out is small, and further release may be slow. Normally, then, these sticks may be so packaged that 95 percent or more of the available chlorine content will be released in one hour's time. A satisfactory water treatment process is suitably based upon this degree of completion. An additional hour permits 98 to 99 percent extraction of the sodium hypochlorite values but these added amounts do not materially change the water treating process.

Methods previously available to the art do not compact mixtures of calcium hypochlorite and sodium sulfate into forms which have the surprising properties of the product of the present invention and particularly the ability when immersed in water to retain precipitated calcium sulfate and original form while releasing aqueous sodium hypochlorite. In the method of compaction described in Phillips U.S. Patent 2,935,387, the temperature and water involved are harmful to the stability of the calcium hypochlorite. Further, the water causes premature reaction to form unstable sodium hypochlorite which decomposes during storage. Similarly in the process of Corrigan in U.S. Patent 2,463,680 the mixture is compressed between two smooth rolls that bear against each other with a force of several tons per lineal inch. In both the Phillips and the Corrigan processes, the product is in flake form, together with fines. The fines are sifted out and the flakes may be broken as desired. However, if a mixture of sodium sulfate and calcium hypochlorite is so flaked and then several pounds placed in a perforated or porous container, the flakes tend to pack together, forming a mass of material through which the leaching water solution has difficulty in passing. Accordingly, after an hour's time, much of the available chlorine is retained in a cemented mass of material which is not readily leached by the water solution.

The figure shows the remarkably rapid rate of release of available chlorine from the prisms of this invention when immersed in water at 21 to 24° C. as described more fully in Example VII. In contrast the other forms required 4 or more times as long to release the same amount of available chlorine. The exhausted prisms of the present invention after eight hours immersion in water are a mass which is remarkably open and has the same visual appearance as the prisms before immersion. Water flows freely through this product and extracts the available chlorine rapidly.

The specified size of the particles of calcum hypochlorite and sodium sulfate is important to the present invention. The very fine particles of calcium hypochlorite and sodium sulfate form fine crystals of gypsum which are thin needles usually under 10 microns in length. In contrast, larger particles of the reactants permit the formation of larger crystals of gypsum. Some of these larger particles may be in tablet or sheet form instead of in needle form, which are of less value in forming a firm stick which will retain its form under some stress. In general, the crystals of gypsum form around but outside the particles of calcium hypochlorite, and are fed by the calcium solutions diffusing out of the particle.

The product of this invention meets many of the needs of field water treatment. The product can be packaged in various ways according to the use to which it is to be put. Generally, the purpose of the material is to supply available chlorine to a body of water. In some applications, the sticks of the present invention are added directly to the water to be treated. Alternatively, the sticks may be placed in a perforated container and this container immersed in a large tank of water. The mass of sticks remains loosely packed, quite porous and easily leached by water. With water at room temperature or above, 90 to 95 percent of the available chlorine is released within one hour. This high rate of discharge is especially useful for the treatment of tropical waters where normally only one hour is allowed for the addition of available chlorine. Some tropical waters are so contaminated that extreme break point chlorination is desirable. A high dosage of hypochlorite is added to the water, which is held for an hour or longer to effect the break point reaction and then the water is filtered and treated with carbon to remove the remaining available chlorine. In this process it is important to get a large proportion of the available chlorine into the water rapidly so that the break point reaction can proceed.

For field use in military maneuvers, the perforated container may be formed of a polyethylene bag containing perforations, which may be uniformly applied to the polyethylene. The form of the sticks is clearly visible through the wall of the bag both before and after immersion in water, and shows that the bulk of the calcium salt has stayed behind. In this use, the presence of a small amount of solids including a portion of the calcium sulfate derived from the calcium hypochlorite, is not as important as a fast rate of release of the available chlorine content. The solid matter and the calcium in solution or present as calcium sulfate, may impede subsequent filtration somewhat, but overall, the faster release of the available chlorine is more important. Accordingly, for such use, the sticks are suitably packed in perforated bags or other very porous containers which may permit a minor portion of the solids to pass out along with the sodium hypochlorite solution.

Where this available chlorine is to be supplied as sodium hypochlorite solution substantially free from solid matter the sticks are suitably placed in a porous bag, made from a web of laid, hypochlorite-resistant fibers, suitably having a porosity of 0.01 to 1.5 but preferably 0.02 to 1.0 by the Gurley Hill test described in TAPPI (Technical Association of the Pulp and Paper Industry) Method T460m-49. The stick form is particularly advantageous for some uses where the sticks are placed in such porous bags. For example, in the swimming pool trade, the customer likes to know that the objectionable calcium has been retained within the bag. The feel of the sticks in the bags is substantial proof of this. If, in place of sticks, granular sodium sulfate and granular calcium hypochlorite is placed in bags, the mass forms a somewhat solid lump, from which the sodium hypochlorite leaches out slowly for some time. The appearance of the lump in the bag would not assure the customer as well as the sticks do.

Anyone opening an exhausted bag of the sticks would agree that the water had ample opportunity to leach out all the available chlorine, as the mass of sticks is visibly quite porous. In such containers the sodium hypochlorite solution leaches rapidly out of the sticks but additional time is required for it to leach out of the porous bag. The rate of introduction of sodium hypochlorite into the body of water is slower due to restraining action of the porous bag on the strong solution of sodium hyuochlorite and a much longer time is required for the release of the useful portion of the available chlorine contained in the bag. This time may be regulated, as from four to eight hours, by adjusting the porosity of the web of which the bags are constructed. However, the porous bag effectively retains any calcium sulfate not retained by the sticks and substantially no cloud or precipitate is observed in the body of water treated.

The calcium hypochlorite compositions of this invention have further advantages over commercial aqueous sodium hypochlorite in stability, in avoiding the shipment of large quantities of water and, particularly for swimming pool use, in the lower degree of excess alkalinity. This reduces the amount of additional chemicals required for adequate pH control of the swimming pool water.

For some purposes it may be desirable, after the initial rapid release of available chlorine from the sticks of the present invention to have lesser amounts of available chlorine released slowly over a longer period. For these purposes, the sticks of the compressed mixture of calcium hypochlorite and sodium sulfate of the present invention can be mixed with tablets of the same or other hypochlorite compositions which furnish hypochlorite slowly. Alternatively, separate containers of tablets may be added to the water along with containers of sticks or the sticks and tablets may be combined in a single container. In such a combination, the sticks release substantially all their available chlorine within the first hour and the tablets continue to release small amounts such as 1 percent of the main treatment, during each subsequent hour of the desired period, normally less than 8 hours total.

The pressures used in compacting the mixture of calcium hypochlorite and sodium sulfate are important to the production of sturdy sticks. Packages containing these compositions, after manufacture, are subject to repeated shipping and storage periods before being finally put to use, and in shipment, minor amounts of the stick material may be broken down to powder form of such size that it may escape through the perforations in the container. This powder reacts on contact with water to form sodium hypochlorite solution and needles of gypsum, but these particles of gypsum crystals dissolve in the large volume of water into which they are placed. This adds calcium ions and sulfate ions, as well as the desired sodium hypochlorite to the treated water. While the sulfate ions have no objectionable effect, the calcium ions, in some waters, cause precipitates which make filtration somewhat more difficult. Consequently it is desirable to compress the sticks so firmly, and to package the material so that it reaches its point of use with as little powdered contents as possible.

*Example I*

A mixture of equal weights of finely powdered calcium hypochlorite ("HTH" brand) and anhydrous sodium sulfate was prepared in a blender. The HTH was 70 percent calcium hypochlorite and contained less than 1.5 percent water. Screen analyses of the starting materials were:

| Screen | Weight Percent | |
| --- | --- | --- |
| | "HTH" | Na₂SO₄ |
| On 30 mesh | 0 | 0 |
| On 70 mesh | 18.3 | 15.0 |
| On 100 mesh | 32.0 | 57.0 |
| On 200 mesh | 32.0 | 24.6 |
| Through 200 mesh | 17.7 | 3.4 |
| | 100.0 | 100.0 |

The blended powder mixture was fed to a Chilsonator under a feed pressure of 40 p.s.i.g. The corrugated rolls, having a diameter of 6 inches, were urged together under a pressure of 50,000 pounds and turned at 12 to 14 r.p.m. This required 3.9 horsepower. The product was extruded as triangular prisms which broke into sticks about 1 to 1.5 inches in length. A minor proportion of multiple sticks was present. Production was 100 pounds in 6 minutes or 1,000 pounds per hour. For some of the tests described in subsequent examples this product was used in this form. In other examples this product was gently crushed between corrugated rollers and screened, separating the product through 5 mesh and on 30 mesh U.S. Standard screens. The yield of this product containing between 35 and 37 percent of available chlorine was 80 percent. Oversize material was returned to the crushing rollers and underside was recycled to the Chilsonator.

*Example II*

A mixture of equal weights of powdered calcium hypochlorite (HTH), anhydrous sodium sulfate (Na₂SO₄) and butterflake salt, having the screen analyses shown in the table below, was thoroughly blended.

| Screen | Weight Percent | | |
| --- | --- | --- | --- |
| | "HTH" | Na₂SO₄ | Salt |
| On 50 mesh | 0.4 | 0.7 | 79.7 |
| On 70 mesh | 18.9 | 2.0 | 14.2 |
| On 100 mesh | 33.4 | 17.0 | 4.2 |
| On 200 mesh | 29.3 | 51.6 | 1.9 |
| Through 200 mesh | 18.0 | 28.7 | |
| | 100.0 | 100.0 | 100.0 |

The mixture fed to a Chilsonator at 40 p.s.i.g. feed pressure and 46,000 pounds roll pressure with the rolls turning at 14 r.p.m. and requiring 4.4 horsepower produced similar sticks at a rate of 1080 pounds per hour (225 pounds in 12.5 minutes).

*Example III*

The unscreened Chilsonated product of Example I was used to demonstrate the stability of this product in shipment and the rapid transfer of available chlorine without gross transfer of calcium to a large body of water. For this purpose 4.6 pounds of this product was placed in a sheet polyethylene bag (8 x 18 inches) perforated with 1 mm. diameter holes to give 1.6 percent open area. The perforated bag was tied and placed inside a similar bag of 2 mil polyethylene (not perforated) which was then tied. Twelve such packages were placed in a 3 mil polyethylene drum liner which was tied and placed in a 14-gallon drum. The drum was closed and shipped and reshipped several thousand miles to its destination. The product was in excellent condition for use as shown by the following test:

One of the perforated bags and contents was hung in a tank containing 1500 gallons of water of negligible chlorine demand. The water was stirred and samples taken after 20 minutes showed that 60 p.p.m. of available chlorine was discharged into the water in this time. The available chlorine increased to 102 p.p.m. in one hour and to 123 p.p.m. in two hours. Substantially all the available chlorine had passed out of the Chilsonated sticks and into the water in two hours. The material in the bag was analyzed, showing calcium retention of 80 percent.

*Example IV*

One half pound of the screened Chilsonated composition prepared as described in Example I (through 5 and on 30 mesh) was placed in each of a number of bags of laid Dacron fibers. These bags were made of nonwoven Dacron sheets having a Gurley porosity of 0.2. The sheets weighed 1.5 ounces per sq. yard, and the bags were 4.5 inches wide and 7 inches long, with a ⅝ inch wide seal at both ends. This amount of material provides about one p.p.m. of available chlorine in a 20,000-gallon pool. A number of these bags were placed in the skimmers of ten swimming pools where the available chlorine was released to treat the water. Ninety percent of the available chlorine was released in 4 to 6 hours but the bags were left in place for 24 to 48 hours. At the end of that time they were removed, dried and analyzed for calcium content. The analyses showed that 92 percent of the calcium was retained in the bag in the two-day tests. Tests continued for one month, adding fresh bags every two or three days, showed that the pool water had improved clarity during the treatment. The low alkali content of this HTH product required appreciably less chemical treatment for pH control of the pools than that previously required when the available chlorine was supplied by liquid bleach.

*Example V*

A mixture of 50 parts of HTH fines and 50 parts of anhydrous sodium sulfate having the screen analyses shown in Example I and 25 parts of sodium nitrate of similar fineness thoroughly blended and Chilsonated as described in Example I yields 1 to 1.5 inch sturdy sticks which, in water, rapidly release their available chlorine.

*Example VI*

Comparative tests were made on compositions containing equal parts of HTH and sodium sulfate in the various forms shown in the table below. One-half pound of each material was placed in a laid Dacron bag, all of the same porosity and structure. The tablets were prepared on a commercial tableting machine and the tablets crushed through a series of spaced, serrated rolls to the desired size. Crushed materials were screened or left unscreened as indicated in the table using commercial screening equipment. The bags were made on commercial machines, filled by hand and sealed on commercial machines. Each bag was hung in a separate jar of water with the top of the bag at the water level. By analyzing the water in the jar, the available chlorine released was followed and the time required for 90 percent of the available chlorine to be released was determined. The percent of the total available chlorine released after 24 hours was also determined.

| No. | Material | Apparent Density | Release of Available Chlorine | |
|---|---|---|---|---|
| | | | Hours for 90 pct. | Pct. in 24 hrs. |
| 1 | Product of Example I unscreened | 0.85 | 4 | 96 |
| 2 | Same, screened (on 16 mesh) | .83 | 4 | 96.5 |
| 3 | Product of Example I, crushed (through 5 mesh) | 1.23 | 10 | 93 |
| 4 | Same, screened (through 5 on 16 mesh) | 1.07 | 5 | 97 |
| 5 | Tablets, crushed (under ⅜ inch) | 1.15 | 12 | 97 |
| 6 | Same, same (½ to ⅜ inch) | 1.00 | 12 | 94 |
| 7 | Same, same (⅜ to ¼ inch) | .95 | 10.3 | 94.5 |
| | Powder mixture (not compacted) | | | Pct. in 120 hrs. |
| 8 | Through 30 on 70 mesh | 1.00 | 72 | 91.3 |
| 9 | Both components 50 pct. through 100 mesh | .95 | 72 | 92 |

This table shows the superiority of the low density Chilsonated sticks (Item No. 1). The minor amount of fines, removed by screening (Item No. 2) had no significant effect on the properties of the product. The adverse effect of severe crushing of the product of Item No. 1 is shown in Item No. 3. The crushed product, containing all the fines had an apparent density of 1.23, the time of release of 90 percent of the available chlorine was raised to 10 hours. Item No. 4 shows that the crushed material, freed from fines by screening, separating a fraction through 5 on 16 mesh, retains the advantageous properties of the product of this invention but offers no advantage over the Chilsonated material as it comes from the machine. Items 5, 6 and 7 show that tablets even when crushed and screened do not have the advantageous properties of the product of this invention. The crushed tablets are generally denser, pack more tightly and do not provide the rapid release of available chlorine afforded by the product of this invention. The uncompacted powder mixtures (Items 8 and 9) form an aggregate through which water permeates only slowly and they are not useful for rapid release of available chlorine.

*Example VII*

The unscreened Chilsonated product of Example I was bagged as described in Example IV. Similar bags were prepared containing the same mixed components in the form of tablets (¾ to ⅜ inch), crushed tablets (screened to ¼ to ½ inch size) and granular. The latter was a mixture of equal weights of granular HTH (through 14 on 30 mesh) and anhydrous sodium sulfate having the screen analysis shown in Example I. Each bag was suspended 18 inches below the surface of 50 gallons of water in a 55-gallon polyethylene drum. Tap water at 21 to 24° C. was used and it was stirred occasionally prior to removing samples for analysis: The data are shown in the attached figure. In this essentially static test, the Chilsonated product of the present invention released 80 percent of its available chlorine in 3.5 hours whereas the crushed tablets required 14 hours, the whole tablets 21.5 hours and the granular 27.5 hours for the same degree of available chlorine release.

*Example VIII*

The sodium sulfate-calcium hypochlorite mixture prepared as described in Example I was diluted with 6, 12 and 24 percent flaked salt (sodium chloride) and thoroughly mixed. Each of these mixtures was Chilsonated as described in Example I to produce sturdy modified prisms. Sufficient of each product to provide equal weights of available chlorine was sealed in a bag made of sheets of laid Dacron fiber having a weight of 1.5 ounces per square yard. All the sheets were of the same porosity. Each bag was suspended in a jar of water at 25° C. The available chlorine released was determined in samples withdrawn at intervals with the following results:

| Time, hours | Diluent Salt, Percent | | | |
|---|---|---|---|---|
| | 0 | 6 | 12 | 24 |
| 0.5 | 38.7 | 20.8 | 18.7 | 24.2 |
| 1 | 59.2 | 40.5 | 34.7 | 43.7 |
| 2 | 80.3 | 67.4 | 60.0 | 70.0 |
| 3 | 91.0 | 85.3 | 77.4 | 83.2 |
| 4 | 96.8 | 94.2 | 88.2 | 91.0 |
| 7 | 100 | 100 | 98.0 | 95.4 |
| 12 | 100 | 100 | 100 | 100 |

The body of the above table shows the percent of available chlorine charged to each bag which was transferred to the water in the time indicated. The data show how the rate of transfer can be modified using diluent salt.

What is claimed is:

1. A process for manufacturing calcium hypochlorite compositions by (1) mixing 0.8 to 2 parts by weight of particles of anhydrous sodium sulfate, one part by weight of particles of calcium hypochlorite and from 0.2 to 3 parts by weight of a water-soluble inert diluent alkali-metal salt to form a mixture of said particles, all of said particles being finer than 30 mesh and at least 25 percent by weight of the particles of said sodium sulfate and said calcium hypochlorite being finer than 100 mesh; (2) extruding said mixture into the form of modified triangular prisms with one rounded edge opposite a concave side by the steps of:

(a) precompressing said mixture into the nip between a pair of rolls having circumferential corrugations consisting of alternating ridges and valleys, said ridges and valleys having curvilinear cross-sections, said ridges being truncated, thereby incompletely penetrating said valleys, (b) rotating said rolls in opposite directions, (c) urging said rolls against each other with a pressure of 10 to 60 tons per lineal inch.

2. The process of claim 1 in which the water-soluble inert diluent alkali metal salt is sodium chloride.

3. The process of claim 1 in which the water-soluble inert diluent alkali metal salt is potassium nitrate.

4. The process of claim 1 in which the water-soluble inert diluent alkali metal salt is sodium nitrate.

5. The process of claim 1 in which the water-soluble inert diluent alkali metal salt is lithium chloride.

6. The process of claim 1 in which the water-soluble inert diluent alkali metal salt is potassium chloride.

References Cited by the Examiner

UNITED STATES PATENTS

| | | | |
|---|---|---|---|
| 1,678,987 | 7/1928 | MacMahon | 252—187 |
| 2,023,459 | 12/1935 | Bachman | 252—187 |
| 2,463,680 | 3/1949 | Corrigan | 252—135 XR |
| 2,935,387 | 5/1960 | Phillips | 23—89 XR |
| 2,963,440 | 12/1960 | Robson | 252—187 |

JULIUS GREENWALD, *Primary Examiner.*

ALBERT T. MEYERS, *Examiner.*